Patented Mar. 6, 1951

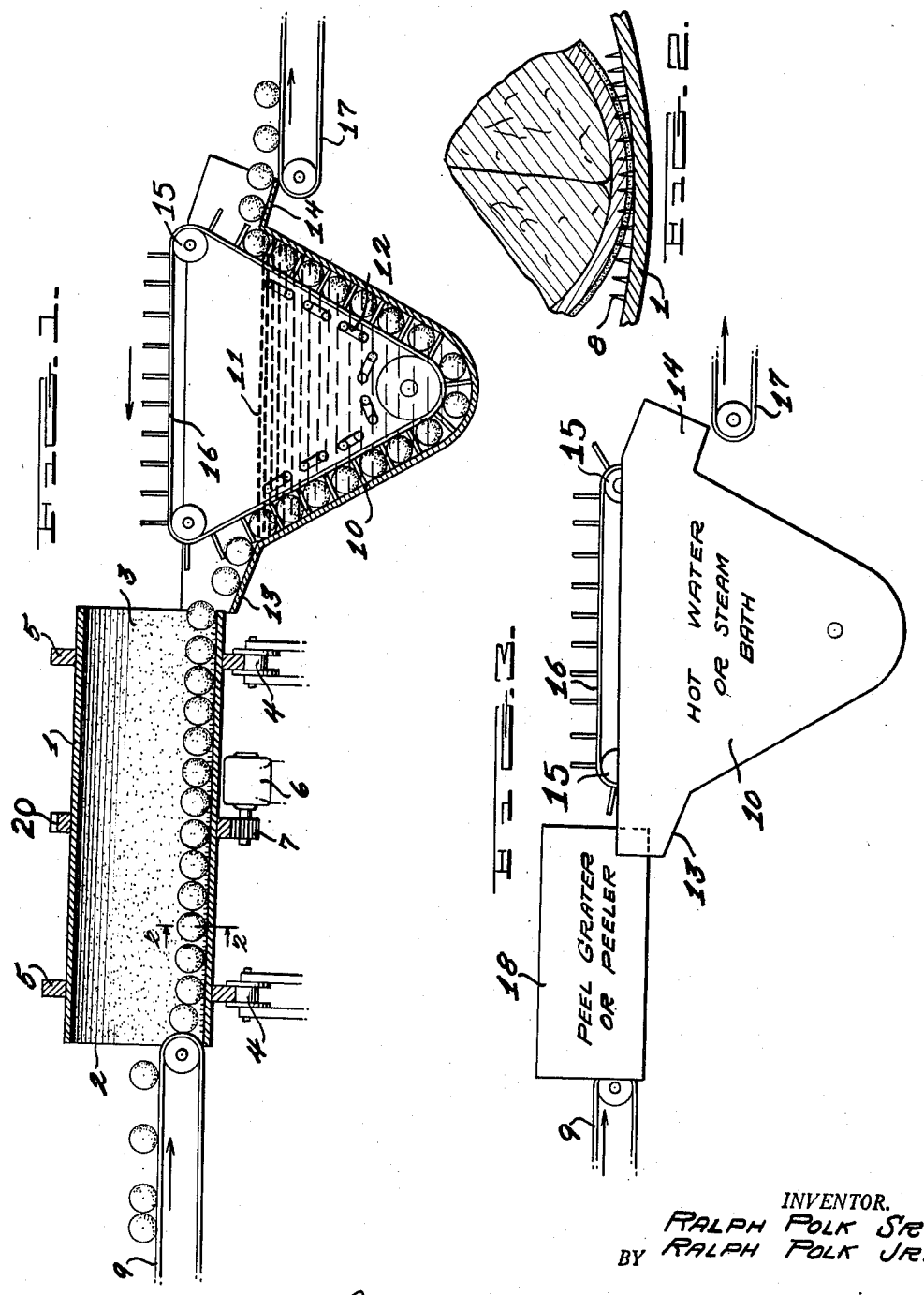

2,543,932

UNITED STATES PATENT OFFICE 2,543,932

TREATMENT OF CITRUS FRUIT TO FACILITATE PEELING

Ralph Polk, Sr., and Ralph Polk, Jr., Tampa, Fla., assignors to The Polk Development Company, Tampa, Fla., a copartnership of Florida Application October 27, 1948, Serial No. 56,844

8 Claims. (Cl. 146—230)

1

This invention relates to the treatment of citrus fruit and more particularly to a method and apparatus for wilting the peel and particularly the albedo layer thereof of citrus fruit, such as grapefruit and oranges, to facilitate the subsequent removal of the peel.

The peel of citrus fruit is composed of two layers: an outer colored layer containing oil cells and known as the flavedo, and an underlying white pithy layer known as the albedo, which in oranges and grapefruit is strongly bonded to the outer membrane walls of the fruit sections. It is known that when the peel is heated, this bond will become loosened and the peel may easily be stripped off.

In sectionizing citrus fruit, i. e. dividing the fruit into its membrane free sections or segmental juice sac groups, it is standard procedure to heat the whole fruit in hot water or steam for six or seven minutes to wilt the peel to facilitate its removal from the fruit. This peel removal is usually performed by hand and following the peel removal, the fruit is immersed in a hot solution of alkali to remove the outer or circumferential membrane wall of the fruit sections which lies immediately below the albedo layer of the peel.

It is necessary that the peel be substantially hot for easy peeling by hand. On the other hand, it is important that the fruit be substantially cool when it is subjected to the hot alkali bath because it has been found that the hotter the fruit is when immersed in the alkali solution, the more the pulp structure is softened, wilted and otherwise damaged by the alkali. For economic reasons the peeling process is carried out continuously from the whole fruit through the final membrane removal which precludes any substantial cooling between the peeling and hot alkali bath steps.

It is an object of this invention, therefore, to provide a method and apparatus for heat treating citrus fruit to wilt the peel preparatory to removing the same in which the time of heating is reduced to a minimum to confine the heat penetration substantially to the peel.

Another object of the invention is to provide a method and apparatus for treating citrus fruit preparatory to peeling the same which reduces materially the peeling time.

Another object of the invention is to provide a method and apparatus for treating citrus fruit preparatory to removing the peel which produces fruit in an optimum condition for hand peeling and in an optimum condition immediately thereafter for hot alkali treatment.

With the above and other important objects and advantages in view the invention consists in the procedural steps and in the parts and combinations hereinafter set forth with the understanding that changes may be made therein which will be obvious to those skilled in the art without departing from the spirit of the invention or exceeding the scope of the appended claims.

In order to make the invention more clearly understood there is shown diagrammatically in the accompanying drawings apparatus which may be used in carrying out the invention.

In the drawings:

Figure 1 is a view showing diagrammatically and in longitudinal section one form of apparatus for carrying out the invention;

Figure 2 is a fragmental cross sectional view taken on the line 2—2 of Figure 1, and Figure 3 is a diagrammatic view in side elevation of another form of apparatus.

In wilting the peel of citrus fruit the heat must penetrate the albedo layer to facilitate its removal. For the reasons set forth above, however, the heat should not substantially penetrate the juice bearing pulp. To accomplish these conditions, the heat should be applied at a relatively high temperature (approximately that of boiling water) and for a relatively short time to prevent transfer appreciably into the pulp. The outer, colored layer of peel substantially retards heat penetration, and it follows that if the albedo is exposed directly to the heat, the time of heating and consequent transfer to the pulp can be reduced and still obtain effective wilting and loosening of the peel.

The albedo may be exposed in several ways: the outer peel may be either entirely or partially removed by peeling off the outer peel with a knife by hand or by a mechanical peeler, or by abrasion in a peel grater, several types of which are commercially available. We have found, however, that effective exposure of the albedo may be obtained by puncturing the outer layer of peel at relatively closely spaced points distributed over its entire area in a tumbling drum or cylinder which will be described. After thus exposing the albedo, the fruit is passed through a hot water bath or a steam chamber or subjected to the action of steam or hot air jets for a period of time sufficient for the heat to penetrate and wilt the albedo, but insufficient for transfer substantially into the pulp. By way of example it has been found that with grapefruit of middle maturity, a heat treatment in boiling water for two minutes is sufficient to condition the peel for easy hand removal as compared with six to seven minutes boiling water treatment in standard practice with the outer peel intact. The fruit in both cases is peeled immediately after being taken from the hot water, but in the shorter treatment, the fruit is found substantially cool after the peeling operation and the pulp in good condition to withstand the hot lye bath. When hot water is used as the source of heat, it has been found that the heating time can be still further reduced by the addition of a wetting agent to the water.

Referring now to the drawings, there is shown diagrammatically in Figure 1 an apparatus for carrying out the invention by first puncturing the outer peel. This apparatus consists essentially of a rotary drum or cylinder 1 open at both ends and supported for rotation about its longitudinal axis which is inclined slightly from its input end 2 to its output end 3 such as on rollers 4 engaging annular tracks 5 around the cylinder. The cylinder may be power driven such as by means of an electric motor 6 and a pinion 7 driven thereby and engaging a ring gear 20 carried by the cylinder.

The interior surface of the cylinder 1 is provided with a multiplicity of relatively closely spaced, radially extending, pointed pins 8 (best seen in Figure 2) about one-eighth inch long or sufficiently long to penetrate the outer peel layer of a fruit without penetrating completely through the albedo and into the pulp.

Whole fruit is fed into the input end 2 of the cylinder, such as by means of an endless belt conveyor 9, and rolls down to the outlet end 3 while being rotated by the rotating cylinder over the pins 8 which puncture the outer peel at closely spaced points over its entire surface. At the outlet end 3 of the cylinder the fruit discharges into a tank 10 where it receives its heat treatment.

The tank 10 may be of any suitable form which will contain the heating medium and through which the fruit may be conveyed, preferably in a predetermined time. Conveniently the tank may be V-shaped, as illustrated, and contain a body of water 11 which may be heated such as by steam coils 12 immersed therein. A wetting agent may be added to the water if desired. At the input side next to the cylinder 1 the tank 10, above the water line, is provided with an input lip or chute 13 which underlies the discharge end of the cylinder 1, while at the opposite side the tank is provided with a discharge chute 14, also above the water line.

Mounted to travel through the tank 10 over pulleys 15 is an endless drag conveyor 16 which enters the tank from above the water line on the input side of the tank next the cylinder 1 and moves downwardly from the input chute 13 along one inclined wall, over the curved bottom, and upwardly along the opposite inclined wall emerging from the water at the discharge chute 14. The flights of the conveyor 16 extend from their carrying chains toward the walls of the tank, and are spaced apart to accept fruit between them as seen in Figure 1.

The operation of the apparatus will be clearly seen from Figure 1. Whole fruit is fed into the input end of the rotating cylinder 1 by suitable means such as a belt conveyor 17. In the cylinder the fruit rolls toward the discharge end by virtue of the inclination of the tank, and at the same time is rotated by the rotating cylinder. These two actions of the fruit as it moves over the pins 8 causes it to be pierced through the outer peel with a multitude of small punctures over the entire area of the peel.

Reaching the discharge end of the cylinder, the punctured fruit drops onto the input lip 13 of the tank 10 where it is picked up by the flights of the conveyor 16 and conveyed through the hot water to the discharge chute 14 from which it rolls by gravity onto a conveyor 17 and is carried to the peelers.

In the passage through the tank 10 the hot water penetrates through the punctures in the outer peel and into the albedo, wilting the albedo and loosening its bond with the fruit sections. The speed of the conveyor 16 may be regulated according to the thickness of the albedo layer of the particular fruit to permit the hot water to perform its wilting function during the passage of the fruit through the tank without substantial heat transfer to the pulp of the fruit. It has been found that the time required to produce this result on grapefruit of middle maturity to be about two minutes as contrasted with six to seven minutes required in the conventional method of immersing the whole fruit in boiling water with the outer peel intact.

The fruit can be hand peeled immediately after discharge from the tank 10, and when so peeled will be found substantially firm and relatively cool and in an optimum condition to be placed immediately in the hot lye bath to remove the outer sectional membrane preparatory to sectionizing.

Although water at or about the boiling point is shown and described above as a preferred heating medium, it will be appreciated that steam or heated air either in a chamber or by way of jets may be used with equivalent effect.

Another method of preparing the fruit for the heat, albedo wilting treatment is to entirely or partially remove the outer layer of peel by hand or mechanical peeling or grating in well-known manners. Such means are indicated diagrammatically as 18 in Figure 3 which represents a fruit peeler or grater of conventional design, several of which are commercially available.

The second method operates in the same manner as described above. The whole fruit is supplied the peeler or grater which removes or partially removes the outer peel layer and exposes the albedo after which it is fed to the heating unit 10 and subjected to the action of hot water or steam to wilt and loosen the albedo. It is then discharged to the peeling operation for removing the albedo.

It will be seen from the foregoing that the invention provides a method and apparatus for treating citrus fruit to facilitate peeling the same which prepares the peel for more efficient access of heat to the albedo, thereby reducing the time of heating necessary to penetrate the albedo and as a consequence reducing the amount of heat transfer into the pulp.

We claim:

1. A method of treating citrus fruit to facilitate removal of the peel therefrom comprising the steps of mutilating the outer peel layer to expose the albedo, and subsequently subjecting the fruit to heat at least the temperature of boiling water to wilt the albedo.

2. A method of treating citrus fruit to facilitate removal of the peel therefrom comprising the steps of puncturing the outer peel layer completely through the same at a multiplicity of points over substantially the entire area thereof, and subsequently subjecting the fruit to heat at least the temperature of boiling water to wilt the albedo.

3. A method of treating citrus fruit to facilitate removal of the peel therefrom comprising the steps of puncturing the outer peel completely through the same at a multiplicity of points over substantially the entire area thereof to expose the albedo, and subsequently immersing the fruit in water heated substantially to boiling to wilt the albedo.

4. A method of treating citrus fruit to facilitate removal of the peel therefrom comprising the steps of mutilating the outer peel layer to expose the albedo, and subsequently subjecting the fruit to steam to wilt the albedo.

5. A method of treating citrus fruit to facilitate removal of the peel therefrom comprising the steps of puncturing the outer peel completely through the same at a multiplicity of points over substantially the entire area thereof, and subsequently subjecting the fruit to steam to wilt the albedo.

6. A method of treating citrus fruit to facilitate removal of the peel therefrom comprising the steps of mutilating the outer peel layer to expose the albedo, and subsequently immersing the fruit in hot water containing a wetting agent and heated substantially to boiling to wilt the albedo.

7. A method of treating citrus fruit to facilitate removal of the peel therefrom comprising the steps of puncturing the outer peel completely through the same at a multiplicity of points over substantially the entire area thereof, and subsequently immersing the fruit in hot water containing a wetting agent and heated substantially to boiling to wilt the albedo.

8. A method of treating citrus fruit to facilitate removal of the peel therefrom comprising puncturing the outer peel layer completely through the same at a multiplicity of points over substantially the entire area thereof, and subsequently subjecting the fruit to heat at least the temperature of boiling water for a time sufficient to wilt the albedo but insufficient to result in substantial transfer of heat to the juice bearing pulp of the fruit.

RALPH POLK, Sr.
RALPH POLK, Jr.

REFERENCES CITED

The following references are of record in the file of this patent:

UNITED STATES PATENTS

| Number | Name | Date |
|---|---|---|
| 722,840 | Hammer | Mar. 17, 1903 |
| 1,514,774 | Le Fevre | Nov. 11, 1924 |
| 1,601,027 | Le Fevre | Sept. 28, 1926 |
| 2,226,513 | McKinnis | Dec. 24, 1940 |
| 2,354,878 | Platt | Aug. 1, 1944 |

FOREIGN PATENTS

| Number | Country | Date |
|---|---|---|
| 118,279 | Australia | Mar. 30, 1944 |